United States Patent [19]

Sabata et al.

[11] Patent Number: 5,326,594
[45] Date of Patent: * Jul. 5, 1994

[54] METAL PRETREATED WITH AN INORGANIC/ORGANIC COMPOSITE COATING WITH ENHANCED PAINT ADHESION

[75] Inventors: Ashok Sabata, Middletown; Wim J. van Ooij, Fairfield, both of Ohio

[73] Assignee: Armco Inc., Middletown, Ohio

[*] Notice: The portion of the term of this patent subsequent to Apr. 28, 2009 has been disclaimed.

[21] Appl. No.: 984,385

[22] Filed: Dec. 2, 1992

[51] Int. Cl.$^5$ ............................................. B05D 3/12
[52] U.S. Cl. ................................. 427/327; 427/337; 427/387; 427/388.4
[58] Field of Search ............ 427/327, 337, 387, 388.9; 422/13

[56] References Cited

U.S. PATENT DOCUMENTS

| | | | |
|---|---|---|---|
| 3,175,921 | 3/1965 | Hedlund | 427/388.2 |
| 3,994,751 | 11/1976 | Ingram | 148/6.14 R |
| 5,108,793 | 4/1992 | van Ooij et al. | 427/327 |

FOREIGN PATENT DOCUMENTS

| | | |
|---|---|---|
| 69376 | 6/1981 | Japan . |
| 100676 | 8/1981 | Japan . |
| 128174 | 7/1983 | Japan . |
| 40151 | 2/1986 | Japan . |
| 7877 | 1/1988 | Japan . |
| 116783 | 5/1988 | Japan . |
| 34790 | 2/1990 | Japan . |
| 94770 | 3/1992 | Japan . |

OTHER PUBLICATIONS van Ooij & Sabata, "Effect of Paint Adhesion on the Underfilm Corrosion of Painted Precoated Steels" Mar. 11-15, 1991, paper 417, NACE.

*Primary Examiner*—Shrive Beck
*Assistant Examiner*—David M. Maiorana
*Attorney, Agent, or Firm*—R. J. Bunyard; L. A. Fillnow; R. H. Johnson

[57] ABSTRACT

Painted metal sheet pretreated with a composite coating including an insoluble, inorganic inner layer and an organic outer layer. The inorganic layer is formed by rinsing the sheet with an alkaline solution containing at least 0.005M of at least one of a dissolved silicate or a dissolved aluminate. The sheet is dried to form an inorganic layer having a thickness of at least 2 Å. The inorganically coated sheet then is rinsed with a solution containing at least 0.1 vol.-% of a hydrolyzed silane and at least 0.02 vol.-% of a hydrolyzed crosslinking agent. The silane treated sheet is dried to form a siloxane layer having an average thickness at least 5 Å. After being painted, the siloxane layer forms an adherent bond between the paint and the metal substrate. The metal preferably is a chromium alloyed steel and may be etched prior to being rinsed with the alkaline solution to remove chromium oxide to further enhance the paint adhesion. Preferred rinsing times for the etchant, the alkaline solution and the silane solution are 2–5 seconds, 15–30 seconds and 5–10 seconds, respectively.

16 Claims, No Drawings

3,326,594

METAL PRETREATED WITH AN INORGANIC/ORGANIC COMPOSITE COATING WITH ENHANCED PAINT ADHESION

BACKGROUND OF THE INVENTION

This invention relates to a pretreated painted metal with a composite coating for forming an adherent bond between the paint and the metal substrate. More particularly, the invention relates to a two step process for pretreating the metal with a composite coating including an inner inorganic layer and a siloxane containing outer organic layer.

It has been proposed to improve corrosion resistance and paint adhesion on cold-rolled and galvanized steel by rinsing with a solution containing an organic polymer and a silane. It also has been proposed to rinse the steel with a solution containing a silane and a silicate dispersion for this purpose as well. U.S. Pat. No. 5,108,793; incorporated herein by reference, relates to forming a painted steel pretreated with a two step silane treated silicate coating. The coating is formed by rinsing the steel in an alkaline solution having a temperature of at least 25° C. containing 0.005M silicate and 0.005M metal salt. The steel is dried to form a silicate coating having a thickness of at least 20 Å prior to being treated with an aqueous solution containing 0.5–5 vol. % silane. The silane layer forms a relatively adherent bond between the paint and the silicate coating.

Unlike cold-rolled steel, it is very difficult to obtain good paint adhesion on chromium alloyed steels such as stainless steel. An apparent reason for poor paint wettability is because the surface of these steels is covered with a passive oxide. Many different types of etchants have been used to remove this passive oxide to enhance paint adhesion. This approach, however, has not resulted in good paint adhesion on stainless steel exposed to a long term humid environment.

Other artisans have proposed one or two step rinsing techniques for stainless steels using an acid and a silane coupling agent prior to painting. For example after being rinsed with chromic acid, the etched steel may be rinsed with an aqueous solution containing the silane. Alternatively, the acid solution may include a dispersion of a silicate and/or a dissolved silane.

Still other artisans have tried pretreating stainless steel with alkyl or fluoroalkyl oxide coatings prior to painting. The inorganic coating is formed by rinsing the steel with a solution containing a dispersion of oxide particles of one or more of silicon, aluminum, zirconium, titanium, cerium or tungsten. The solution also may include a silane.

Although chromate films improve paint adhesion on stainless steel, chromic acid solutions or waste materials are not environmentally acceptable and may not be economically disposed of. When used in a one step pretreatment process, a silane does not have the molecular orientation necessary for good paint adhesion. Consequently, silane generally is used in concentrations that result in a coating having an excess thickness. A thick coating, however, tends to be brittle having poor formability. On the other hand, an inorganic coating formed from a solution containing a dispersion of oxide particles is disadvantageous because the liquid and solid phases are incompatible and form a mechanically weak coating structure.

As evidenced by the effort of previous workers, there has been a long felt need to develop a process for improving paint adherence to metal, especially stainless steel. The process should be low cost, use nontoxic materials that can be safely disposed of and provide long term resistance in a humid environment.

BRIEF SUMMARY OF THE INVENTION

This invention relates to a painted metal pretreated with a composite coating for forming an adherent bond between the paint and the metal substrate. In one embodiment, the invention includes rinsing the metal with an alkaline solution including at least one of a silicate and an aluminate and drying the metal to form an inorganic layer. The metal then is coated with an organic layer including a silane and a crosslinking agent. The composite coated metal is cured to form a siloxane containing layer on the inorganic layer.

In another embodiment, the invention includes rinsing the metal with an alkaline solution including at least one of a silicate and an aluminate, drying the metal to form an inorganic layer, rinsing the inorganically coated metal with another solution containing a hydrolyzed silane and a hydrolyzed crosslinking agent, drying the silane treated metal to form a siloxane layer on the inorganic layer and painting the composite coated metal.

Another feature of the invention includes the aforesaid alkaline solution containing 0.005M of the silicate.

Another feature of the invention includes the aforesaid silane solution containing at least 0.1 vol.-% of the silane and at least 0.02 vol.-% of the crosslinking agent.

Another feature of the invention includes the aforesaid metal being a chromium alloyed steel.

Another feature of the invention includes the additional step of etching the aforesaid steel to remove surface passive oxide prior to rinsing with the alkaline solution.

In another embodiment, the invention includes a metal sheet having a composite coating for improving paint adherence. The coating includes an inner relatively insoluble inorganic layer and an outer organic layer. The inorganic layer includes one of a silicate, an aluminate or a mixture thereof. The organic layer is the reaction product of a silane, a crosslinking agent and a resin paint.

Another feature of the invention includes the aforesaid organic layer having a thickness of at least 5 Å.

Another feature of the invention includes the aforesaid inorganic layer having a thickness of at least 2 Å.

Another feature of the invention includes the aforesaid metal sheet being a chromium alloyed steel.

A principal object of the invention is to improve paint adhesion to metal covered with passive oxide.

Additional objects include improving paint adhesion to metal without using toxic materials such as chromates that are difficult to dispose of and a painted metal having high durability in a humid environment.

Advantages of the invention include excellent paint adhesion on chromium alloyed steels without using or creating environmentally hazardous substances, low cost, a hydrolytically stable interface between paint and a metal substrate, applicability to a variety of paint systems and paint having high durability and water resistance.

DETAILED DESCRIPTION OF THE PREFERRED EMBODIMENTS

An important aspect of the invention is using a two step process for sequentially pretreating a metal sheet with an inorganic layer and an organic layer that includes a silane and a crosslinking agent. The organic layer includes the crosslinking agent so that upon being heated, the silane is reacted to form a siloxane. We have determined that siloxane forms a tenacious bond between paint and the metal substrate. Unlike an uncured silane, siloxane has a hydrolytically stable —Si—O—Si— structure that is impervious to water and is believed to form better adhesion because the siloxane is interdiffused throughout the paint layer. That is, the siloxane and paint become an interpenetrating network. Although the siloxane can be formed by sequentially rinsing the inorganically coated metal sheet with one solution containing the silane and another solution containing the crosslinking agent, preferably the sheet is rinsed with a single mixed solution containing both the silane and the crosslinking agent.

To be used as a rinse for forming a continuous adherent layer of siloxane, the crosslinking agent and the silane are hydrolyzed separately in acidic aqueous solutions. After being hydrolyzed, the two solutions containing the crosslinking agent and the silane preferably are combined. The concentration of the crosslinking agent in the rinsing solution should be at least 0.02 vol. % with at least 0.2 vol. % being preferred. The concentration should be at least 0.02 vol.-% to insure the inorganically coated metal is completely covered with a continuous siloxane coating. A concentration above 5.0 vol.-% is undesirable because of excess cost and a thicker siloxane layer tends to become more difficult to form when fabricating the painted metal sheet. The silane concentration preferably should be at least 0.1 vol.-% with at least 0.8 vol. % being preferred to insure that the inorganically coated metal is completely covered with the siloxane coating. A silane concentration above 5.0 vol.-% is undesirable because of excess cost and a thicker siloxane layer tends to crack during fabrication. The siloxane layer must be thin preferably not exceeding an average thickness of about 100 Å. A preferred average thickness of the siloxane layer is in the range of 2–100 Å with at least 10 Å being more preferred. An average siloxane thickness of at least 2 Å is desired to insure that the inorganically coated metal is covered with a continuous siloxane coating. A siloxane thickness above 100 Å is undesirable if the painted metal is to be deeply drawn into a formed part.

No particular immersion time, temperature or pH is required for the silane solution so long as the silane is adsorbed onto the outer surface of the inorganic layer. When chromium alloyed steel is painted, the silane is adsorbed into the inorganic layer and provides a primary bond between the paint and the steel substrate. A preferred silane found to perform very well in the invention was N-[2-(vinylbenzylamino)ethyl]-3-aminopropyltrimethoxy (SAAPS). Examples of other silanes that can be used as well include γ-glycidoxypropyltrimethoxy (GPS), γ-methacryloxypropyltrimethoxy (MPS), γ-aminopropyl trialkoxy (APS), mercaptopropyltriacetoxy, vinylpropyltrimethoxy and diaminosilanes.

Any crosslinking agent can be used to form the siloxane layer of the invention if the crosslinking agent, when hydrolyzed, contains two or more Si(OH)$_3$ groups. The Si(OH)$_3$ groups may be formed from a silicon ester upon hydrolysis, i.e., Si(OX)$_3$ where X is ethyl, methyl or acetoxy. Alternatively, the Si(OH)$_3$ groups may be formed from a silicon halide upon hydrolysis, i.e., SiY$_3$ where Y is a chloride. A preferred crosslinking agent is (CH$_3$O)$_3$SiCH$_2$CH$_2$Si(OCH$_3$)$_3$. Other possible crosslinking agents include (CH$_3$O)$_3$SiCH$_2$CH$_2$CH$_2$Si(OCH$_3$)$_3$, (CH$_3$O)$_3$Si(CH$_2$)$_6$Si(OCH$_3$)$_3$, Si(OC$_2$H$_5$)$_4$, (CH$_3$O)$_3$SiCH$_2$CH$_2$Si(CH$_3$)$_2$—O—Si(CH$_3$)$_2$CH$_2$CH$_2$Si(OCH$_3$)$_3$,

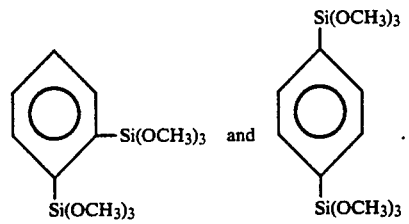

The composite coating of the invention can be applied to metal sheets such as hot rolled and pickled steel, chromium alloyed steel, stainless steel, cold-rolled steel, hot dipped or electroplated metallic coated steel and nonferrous metals such as aluminum or aluminum alloy. Metallic coatings may include aluminum, aluminum alloy, zinc, zinc alloy, lead, lead alloy and the like. By sheet is meant to include continuous strip or foil and cut lengths. The invention has particular utility for chromium alloyed and stainless steels that are to be painted electrostatically with a powder paint or a solvent based paint. These painted metal sheets, particularly cold-rolled steel, may include a phosphate conversion coating applied to the metal substrate prior to applying the inorganic layer. The inorganic/organic composite coating improves corrosion protection and strengthens the bond between the paint and the metal substrate. Chromium alloyed steel, i.e., alloyed with at least 5 wt. % chromium, and stainless steel, i.e., alloyed with at least 10 wt. % chromium such the 300 and 400 hundred series types, have particular utility with the invention since good paint adhesion is very difficult to obtain otherwise.

Another aspect of the invention is being able to quickly form the composite pretreated painted metal in a short period of time. Coating times in excess of 120 seconds generally do not lend themselves to industrial applicability. We determined a painted stainless steel pretreated with the composite coating of the invention can be formed in as little as 30 seconds.

The inner inorganic layer is important because it provides excellent corrosion protection for a steel sheet and enhances the efficiency of the silane so that paint becomes tightly bonded to the steel substrate. This tight paint adhesion is believed to be because the inorganic layer orients the molecular structure of the silane and makes the film more reactive with the paint. The inorganic layer is formed by rinsing a metal sheet with an alkaline solution containing a dissolved silicate, an aluminate or a mixture thereof. We have determined a minimum concentration of the silicate or the aluminate in the solution of about 0.005M insures that a continuous inorganic layer is formed. At concentrations greater than about 0.05M, corrosion resistance is not improved and costs become excessive. When the alkaline solution includes the silicate, the solution preferably also includes a metal salt such as an alkaline earth metal salt.

Any of the alkaline earth salts of $Ba(NO_3)_2$, $Ca(NO_3)_2$ or $Sr(NO_3)_2$ are acceptable for this purpose. After being formed on a chromium alloyed steel sheet, the inorganic silicate and/or aluminate layer must not be dissolved during subsequently processing or must not be dissolved by the corrosive environment within which the painted sheet is placed. The function of the metal salt is for making the inorganic layer insoluble. Since the metal salt reacts in direct proportion with the dissolved silicate, the concentration of the salt should at least equal the concentration of the dissolved silicate. Accordingly, an acceptable minimum concentration of the metal salt is about 0.005M as well.

The present invention has particular utility for providing good paint adhesion for alloyed steels especially chromium alloyed and stainless steels. We have determined that paint can be tenaciously adhered to these alloyed steels by the composite inorganic/organic coating when the steel substrate is etched with an acid to remove any passive surface oxide, e.g., chromium oxide, and the like, prior to pretreating with the composite inorganic/organic coating. Chromium oxide preferably is removed because it is not very reactive with the inorganic layer. Non-limiting acids and their concentrations for this purpose include 5 ml of nitric and 1 ml of hydrofluoric acids in 44 ml of water or 5 ml of hydrochloric and 1 ml of picric acids in 100 ml of ethyl or methyl alcohol, i.e., Vilella's reagent.

It is disclosed herein that a siloxane preferably is formed when an inorganically coated steel sheet is rinsed with an aqueous solution containing both a silane and a crosslinking agent. In an alternative embodiment, the inorganically coated steel may be coated with a blended powder mixture of a thermosetting powder and an organosilane powder. This blended mixture is disclosed in copending patent application filed Aug. 26, 1992; U.S. Ser. No. 07/936,197; incorporated herein by reference. To be used within the scope of the present invention, however, the blended powder mixture also could include a powder crosslinking agent. A homogeneously blended powder composition of the invention could include a thermosetting resin paint; a solid, non-hydrolyzed, functional low molecular weight organosilane that is soluble in the paint and a solid, non-hydrolyzed, crosslinking agent that is soluble in the paint as well. The paint may be any thermosetting polymer such as epoxy, polyester, epoxy-polyester, acrylic, acrylic-urethane or fluorovinyl. Any of the previously described organic silane and crosslinking agents may be used so long as they are solid at ambient temperature, have a melting temperature no higher than the curing temperature of the paint, are capable of being dissolved in an unhydrolyzed form into the paint. By a low molecular weight silane is meant monomeric, dimeric or oligomeric molecules.

In a further embodiment of the invention, the inorganically coated steel sheet could be rinsed with the aqueous solution containing only the crosslinking agent. After drying, the rinsed inorganically coated sheet then may be coated with the blended powder mixture containing the thermosetting paint and the organosilane referred to above. Another embodiment of the invention is to rinse the inorganically coated sheet with the aqueous solution containing only the silane. After drying, the rinsed inorganically coated sheet then may be coated with a blended powder mixture containing the thermosetting paint and a powder crosslinking agent.

EXAMPLE 1

By way of an example, cold-rolled steel (CRS) test panels were alkaline cleaned, dried and then electrostatically coated with an epoxy powder paint having an average thickness of about 30 microns after curing. After the paint was cured, disks having 1.1 $cm^2$ surface area on each side were punched from the test panels and evaluated for paint adherence by being immersed into N-methyl pyrrolidone (NMP) maintained at a temperature of 60° C. This NMP test is described in paper no. 417, incorporated herein by reference, authored by W. J. van Ooij and Ashok Sabata entitled "Effect Of Paint Adhesion On The Underfilm Corrosion Of Painted Precoated Steels", presented at NACE CORROSION/91, Mar. 11-15, 1991. This NMP test measures the paint/metal adhesion. After a period of time, the paint swells and becomes delaminated from a disk surface. For these CRS test panels, the paint became completely delaminated, i.e., 100% of the area, in about 3 minutes.

EXAMPLE 2

In another example, cold-rolled steel test panels were again evaluated for paint adherence similar to that described in Example 1 except the test panels were given a conventional phosphate conversion treatment after cleaning but prior to being painted. None of the paint became delaminated, i.e., 0% of the area, after 50 minutes. This test illustrates the beneficial effect of a phosphate coating for improving paint adherence on cold-rolled steel.

EXAMPLE 3

In another example, 409 stainless steel (SS) test panels were evaluated for paint adherence in a manner similar to that described in Example 1. The paint became completely delaminated, i.e., 100% of the area, in NMP in about 2.7 minutes. In a second adherence test, the panels first were immersed for 21 days in water maintained at 70° C. Thereafter, the panels were evaluated using the NMP test. This second test evaluates the hydrolytic stability of the paint/metal interface. In this second test, the paint became completely delaminated in only 1.2 minutes.

EXAMPLE 4

In another example, type 409 stainless steel test panels were evaluated for paint adherence. A solution containing a hydrolyzed silane was prepared. 1.0 vol. % SAAPS silane was dissolved in a liter of water having a pH of 4 at ambient temperature. After being alkaline cleaned, the test panels were treated with a silane and then electrostatically painted with an epoxy powder. A silane layer having an average thickness of about 10 Å was formed on each side of the panels by immersing the panels into the silane solution for about 15 seconds. The panels then were dried in air and coated with epoxy powder paint. After the paint was oven cured for about 10 minutes at 175° C., the test panels were evaluated for adherence. Half the paint became delaminated after 10 minutes. In the second test after being soaked in the 70° C. water for 21 days and then immersed into NMP, 90% of the paint became delaminated after 10 minutes.

EXAMPLE 5

In this example, type 409 stainless steel was evaluated in a manner similar to the two tests of Example 4 except GPS silane was used.

EXAMPLE 6 AND 7

In these examples, type 409 stainless steel was evaluated in a manner similar to Examples 4 and 5 except the test panels were coated with an inorganic layer prior to being treated with the silane. A waterglass solution was prepared having a concentration of 0.005M dissolved silicate and 0.005M $Ca(NO_3)_2$. The pH of the solution was adjusted to 12 using NaOH and was heated to a temperature of 60° C. After being alkaline cleaned, the test panels were coated with an inorganic silicate coating having an average thickness of about 10 Å on each side by immersing the panels in the alkaline solution for about 15 seconds. The panels then were dried in air and treated with silane.

EXAMPLE 8 AND 9

The invention now will be described. In these examples, type 409 stainless steel was pretreated prior to being painted with the epoxy powder in a manner similar to that described in Examples 6 and 7 except a crosslinking agent (Xlink) was included with the silane solution. 0.2 vol. % of 1,2 bis (trimethoxysilyl) ethane crosslinking agent was hydrolyzed in a separate liter of water having a pH of 4 and at ambient temperature. This solution then was mixed with the silane solution. 10% and 60% of the paint became delaminated after 25 and 15 minutes for the crosslinked SAAPS and GPS silanes, respectively. In the second test after being soaked in the 70° C. water for 21 days and then immersed into NMP, 10% and 100% of the paint became delaminated after 30 and 2.1 minutes for the crosslinked SAAPS and GPS silanes, respectively.

EXAMPLE 10

In this example, paint adherence on type 409 stainless steel was evaluated when the only pretreatment used was to etch the test panels with an acid. The test panels were immersed for 5 seconds into a solution of Vilella's reagent. The test panels then were dried in air and coated with paint as described in Example 1.

EXAMPLES 11 AND 12

In these examples, type 409 stainless steel was etched as described in Example 10 and additionally received the silane pretreatment described in Examples 4 and 5.

EXAMPLES 13 AND 14

In these examples, type 409 stainless steel was etched as described in Example 10 and additionally received the silicate/silane pretreatment (SSL) described in Examples 6 and 7.

EXAMPLES 15 AND 16

In these examples, a preferred embodiment of the invention will be described. Type 409 stainless steel was pretreated in a manner similar to that described in Examples 8 and 9 but additionally were etched with Vilella's reagent as described in Example 10 prior to being pretreated with the silicate/siloxane coating of the invention. None of the paint became delaminated after 70 and 65 minutes for the crosslinked SAAPS and GPS silanes, respectively. In the second test after being soaked in the 70° C. water for 21 days and then immersed into NMP, again none of the paint became delaminated after 50 and 40 minutes for the crosslinked SAAPS and GPS silanes, respectively.

EXAMPLE 17

In another example, test panels were evaluated for paint adherence similar to that described in Example 1 except the test panels were 301 stainless steel.

EXAMPLE 18

In another example illustrating the invention, test panels were evaluated for paint adherence similar to that described in Example 8 except the test panels were 301 stainless steel.

The results of all the tests are summarized in Table 1. Panels treated with a composite silicate/silane coating are identified as SSL in the table. Test results of panels immersed into only NMP are identified as 'Before Exposure'. Test results of panels first soaked in water maintained at 70° C. for 21 days and thereafter immersed into NMP are identified as 'After Exposure'. The NMP paint removal time is identified as NMPRT.

TABLE 1

| Sample | Pretreatment | Before Exposure NMPRT | Before Exposure % Area | After Exposure* NMPRT | After Exposure* % Area |
|---|---|---|---|---|---|
| 1 | CRS | 3 min | 100 | | |
| 2 | CRS + phosphate | 50 min | 0 | | |
| 3 | 409 SS | 2.7 min | 100 | 1.2 min | 100 |
| 4 | 409 SS + Silane (SAAPS) | 10 min | 50 | 10 min | 90 |
| 5 | 409 SS + Silane (GPS) | 6 min | 70 | 1.5 min | 100 |
| 6 | 409 SS + SSL (SAAPS) | 15 min | 20 | 5 min | 90 |
| 7 | 409 SS + SSL (GPS) | 8 min | 80 | 3.1 min | 100 |
| 8 | 409 SS + SSL (SAAPS) + Xlink** | 25 min | 10 | 30 min | 10 |
| 9 | 409 SS + SSL (GPS) + Xlink** | 15 min | 60 | 2.1 min | 100 |
| 10 | 409 SS + Etch | 3 min | 100 | 1.5 min | 100 |
| 11 | 409 SS + Etch + Silane (SAAPS) | 30 min | 50 | 30 min | 50 |
| 12 | 409 SS + Etch + Silane (GPS) | 35 min | 50 | 35 min | 50 |
| 13 | 409 SS + Etch + SSL (SAAPS) | 52 min | 0 | 50 min | 0 |
| 14 | 409 SS + Etch + SSL (GPS) | 50 min | 0 | 30 min | 0 |
| 15 | 409 SS + Etch + SSL (SAAPS) + Xlink** | 70 min | 0 | 50 min | 0 |
| 16 | 409 SS + Etch + SSL (GPS) + Xlink** | 65 min | 0 | 40 min | 0 |
| 17 | 301 SS | 16 min | 95 | | |
| 18 | 301 SS + SSL (SAAPS) + Xlink** | 60 min | 0 | | |

*Test panels water soaked for 21 days at 70° C. before immersion in NMP solvent.
**The invention Examples 1, 3 and 17 demonstrate that paint will not adhere to bare cold-rolled or stainless steels. Example 2 demonstrates that cold-rolled steel given a conventional phosphate pretreatment has excellent paint adherence during a short term exposure. Example 8 demonstrates that stainless steel given a two step silicate/silane pretreatment including a crosslinked SAAPS silane, i.e., the siloxane of the invention, had improved short and long term paint adherence compared to the stainless steels of Examples 4–7 that were not pretreated with siloxane. Examples 15, 16 and 18 demonstrate that stainless steel given a two step silicate/silane pretreatment including a crosslinking agent of the invention after etching the steel substrate had dramatically improved short and long term paint adherence compared to the stainless steels of Examples 10-14 that were not pretreated with siloxane. The short and long term adhesion results for Examples 13 and 14 in Table 1 appear similar to the adhesion results of Examples 15 and 16 in that no delamination of the paint occured. However, visual inspection showed the paint remaining on Examples 15 and 16 to be substantially different than the paint remaining on Examples 13 and 14. The surface of the paint for Examples 15 and 16 was smooth and unpitted with the average thickness of the paint still appearing to be about 30 microns. For Examples 13 and 14, however, the surface of the paint appeared somewhat pitted with the average thickness of the paint appearing to be substantially less than 30 microns. Even though the paint of Examples 13 and 14 did not delaminate, a significant portion of the outer thickness of the paint layer appeared to have been dissolved by NMP. The siloxane of Examples 15 and 16 appears to have interdiffused through the entire paint thickness. That is, the siloxane appears to have penetrated the entire coating network thereby improving not only the interfacial bond between the paint and the steel substrate but also the integrity of the paint layer as well.

In another series of tests for evaluating paint adherence on cold-rolled steels, test panels of Examples 19-22 were pretreated in a manner similar to that described above for Examples 1, 2, 6 and 8 respectively except the panels were electrostatically coated with a polyester powder paint instead of epoxy and the panels were soaked for only 14 days in the long term 'After Exposure' water test rather than 21 days as used in Examples 4-16. The results are summarized in Table 2.

TABLE 2

| Sample | Pretreatment | Before Exposure | | After Exposure* | |
|---|---|---|---|---|---|
| | | NMPRT | % Area | NMPRT | % Area |
| 19 | CRS | 30 min | 90 | 1.3 min | 100 |
| 20 | CRS + phosphate | 60 min | 0 | 10 min | 10 |
| 21 | CRS + SSL (SAAPS) | 60 min | 0 | 2.5 min | 80 |
| 22 | CRS + SSL (SAAPS) + Xlink** | 60 min | 0 | 10 min | 80 |

Example 19 demonstrates that paint will not adhere to bare cold-rolled steel under either short term or long term exposure. Example 20 demonstrates that cold-rolled steel given a conventional phosphate pretreatment has excellent paint adherence under short term and long term exposure. Example 21 demonstrates that cold-rolled steel given the two step corrosion protective silicate/silane pretreatment described in U.S. Pat. No. 5,108,793 has good short term paint adherence if the steel is not pretreated with phosphate prior to coating with the inorganic silicate. However, long term paint adherence is poor, i.e., 80% of the paint became delaminated after only 2.5 minutes in NMP after the test panels were water soaked for 14 days. The results for Example 22 of the invention was similar to that of Example 21 with one notably exception. After the 14 day long term water test, it took four times as long to delaminate a like amount of paint in NMP for Example 22 of the invention as that of Example 21, e.g., 10 minutes instead of 2.5 minutes. For cold-rolled steel, this clearly suggests improved corrosion protection and paint adherence can be obtained over that otherwise obtained using only a silicate/silane pretreatment by sequentially pretreating the substrate with a phosphate, an inorganic layer and an organic silane layer reacted with a crosslinking agent to form a siloxane.

In another series of tests for evaluating paint adherence on cold-rolled steel, test panels of Examples 23-26 were given the same pretreatments as Examples 19-22. Examples 23-26 were evaluated for paint adherence using a crosshatch test. After they were given the 14 long term water soak, the test panels were scribed in a crosshatch manner. The crosshatch was formed by scribing each panel with a series of 10 parallel lines in a first direction and then scribing with another series of 10 parallel lines that perpendicularly intersected the first lines, i.e., forming 100 squares. After being scribed, adhesive tape was applied to the crosshatch areas. Adherence was determined by counting the number of squares adhered to the tape when the tape was removed from the test panels. The results are summarized in Table 3.

TABLE 3

| Sample | Pretreatment | % Paint Loss |
|---|---|---|
| 23 | CRS | 100 |
| 24 | CRS + phosphate | 0 |
| 25 | CRS + SSL (SAAPS) | 100 |
| 26 | CRS + SSL (SAAPS) + Xlink** | 0 |

Example 23 again demonstrates that paint will not adhere to bare cold-rolle steel. Example 24 again demonstrates that cold-rolled steel given a conventional phosphate pretreatment has excellent paint adherence. Example 25 demonstrates that cold-rolled steel given the two step corrosion protective silicate/silane pretreatment (SSL) described in U.S. Pat. No. 5,108,793 still does not have good paint adherence if the steel is not first pretreated with phosphate prior to coating with a silcate/silane pretreatment. Example 26 demonstrates that cold-rolled steel given the two step corrosion protective silicate/silane pretreatment has excellent paint adherence when the silane is reacted with the crosslinking agent of the invention to form siloxane even without a phosphate pretreatment.

It will be understood various modifications can be made to the invention without departing from the spirit and scope of it. Therefore, the limits of the invention should be determined from the appended claims.

What is claimed is:

1. A method of pretreating metal to improve paint adhesion, comprising the steps of:
   providing an alkaline solution including at least one of a dissolved silicate and a dissolved aluminate,
   rinsing a metal sheet with the alkaline solution,
   drying the sheet to form a relatively insoluble inorganic layer,
   coating the inorganically coated sheet with an organic layer,
   the organic layer including a silane and a crosslinking agent, and
   curing the organic layer thereby forming a siloxane containing layer on the inorganic layer.

2. The method of claim 1 wherein the organic layer is a blended powder mixture including a thermosetting resin paint.

3. The method of claim 1 including the additional step of painting the inorganic/siloxane composite coating.

4. A method of pretreating metal to improve paint adhesion, comprising the steps of:
providing an alkaline solution including at least one of a dissolved silicate and a dissolved aluminate,
rinsing a metal sheet with the alkaline solution,
drying the sheet to form a relatively insoluble inorganic layer,
providing an aqueous solution containing a hydrolyzed silane and a hydrolyzed crosslinking agent,
rinsing the inorganically coated sheet with the aqueous solution, drying the silane treated sheet thereby forming a siloxane layer on the inorganic layer, and
painting the inorganic/siloxane composite coating whereby the siloxane forms an adherent bond between the paint and the metal substrate.

5. The method of claim 4 wherein the alkaline solution includes at least 0.005M of the silicate.

6. The method of claim 5 wherein the alkaline solution includes at least 0.005M of a metal salt.

7. The method of claim 4 wherein the sheet is rinsed with the alkaline solution for at least about 10 seconds.

8. The method of claim 4 wherein the aqueous solution includes at least 0.02 vol.-% of the crosslinking agent.

9. The method of claim 4 wherein the aqueous solution includes at least 0.1 vol.-% of the silane.

10. The method of claim 4 wherein the rinsing time with the aqueous solution is at least 5 seconds.

11. The method of claim 4 wherein the sheet is a chromium alloyed steel.

12. The method of claim 11 including the additional step of etching the sheet to remove surface passive oxide prior to rinsing the sheet with the alkaline solution.

13. The method of claim 12 wherein the etching time is at least 2 seconds.

14. The method of claim 4 wherein the silane is N-[2-(vinylbenzylamino)ethyl]-3-aminopropyltrimethoxy.

15. The method of claim 4 including the additional step of rinsing the sheet with phosphate prior to rinsing with the alkaline solution.

16. A method of pretreating steel to improve paint adhesion, comprising the steps of:
providing an alkaline solution including at least 0.005M of one of a dissolved silicate and a dissolved aluminate,
rinsing a chromium alloyed steel sheet with the alkaline solution,
drying the sheet to form a relatively insoluble inorganic layer,
providing an aqueous solution containing at least 0.1 vol.-% of a hydrolyzed silane and at least 0.02 vol.-% of a hydrolyzed crosslinking agent,
rinsing the inorganically coated sheet with the aqueous solution,
drying the silane treated sheet thereby forming a siloxane layer, and painting the inorganic/siloxane composite coating whereby the siloxane forms an adherent bond between the paint and the steel substrate.

* * * * *